US007010851B2

(12) United States Patent
Cassese et al.

(10) Patent No.: US 7,010,851 B2
(45) Date of Patent: Mar. 14, 2006

(54) AUTOMATED MACHINE FOR SETTING BENDABLE NAILING PINS ON A FRAME

(75) Inventors: Pierre Cassese, Rue de la Mairie (FR); Alain Cassese, Allée de la Marnière (FR); Jean Cassese, Place du Colombier (FR); Philippe Cassese, Lés Essarts (FR); Bernard Bucaille, Ferme de la Vallée (FR)

(73) Assignee: Cassese Societe Anonyme, Verneuil l' Etang (FR)

( * ) Notice: Subject to any disclaimer, the term of this patent is extended or adjusted under 35 U.S.C. 154(b) by 0 days.

(21) Appl. No.: 10/250,910

(22) PCT Filed: Dec. 21, 2001

(86) PCT No.: PCT/FR01/04156

§ 371 (c)(1),
(2), (4) Date: Jan. 26, 2004

(87) PCT Pub. No.: WO02/055273

PCT Pub. Date: Jul. 18, 2002

(65) Prior Publication Data

US 2004/0144445 A1 Jul. 29, 2004

(30) Foreign Application Priority Data

Jan. 11, 2001 (FR) .................................. 01 00298

(51) Int. Cl.
*B23Q 15/00* (2006.01)
*B23P 21/00* (2006.01)

(52) U.S. Cl. ............................ 29/714; 29/709; 29/716; 29/809; 29/818; 29/243.53; 227/156

(58) Field of Classification Search .................. 29/701, 29/702, 703, 708, 709, 715, 716, 818, 243.53, 29/809, 243.56; 227/109, 156, 178.1
See application file for complete search history.

(56) References Cited

U.S. PATENT DOCUMENTS

| | | | | | |
|---|---|---|---|---|---|
| 2,743,445 | A | * | 5/1956 | Lerner | 206/346 |
| 3,556,316 | A | * | 1/1971 | Marasso et al. | 414/795.8 |
| 3,590,463 | A | * | 7/1971 | Burroughs et al. | 483/1 |
| 4,026,453 | A | * | 5/1977 | Davison et al. | 227/109 |
| 4,380,487 | A | * | 4/1983 | Zodrow | 156/568 |
| 4,486,928 | A | * | 12/1984 | Tucker et al. | 29/26 A |
| 4,510,684 | A | * | 4/1985 | Hutchins et al. | 29/703 |
| 4,520,550 | A | * | 6/1985 | Dunn et al. | 483/1 |
| 4,660,274 | A | * | 4/1987 | Goumas et al. | 483/7 |

(Continued)

FOREIGN PATENT DOCUMENTS

DE 4405661 A 8/1995

(Continued)

*Primary Examiner*—Essama Omgba
(74) *Attorney, Agent, or Firm*—Finnegan, Henderson, Farabow, Garrett & Dunner, L.L.P.

(57) ABSTRACT

The machine includes a movable carriage (5) carrying an application gun (8) filled with pins for application, which is movable above a work station composed of a table (1) carrying an endless belt (2). The machine is provided with a rack (10) for storing a plurality of guns (8) pre-filled with pins, which rack can be accessed by a gripping holder (7) carried by the carriage (5). A detector mounted on the gun can ascertain the absence of a pin in the frame at the application location and instruct the movement of the holder towards the rack.

5 Claims, 2 Drawing Sheets

U.S. PATENT DOCUMENTS

| | | | | | |
|---|---|---|---|---|---|
| 4,941,577 | A | * | 7/1990 | Ferree et al. | 211/70.6 |
| 5,123,158 | A | * | 6/1992 | Dixon | 29/714 |
| 5,427,297 | A | * | 6/1995 | Tymianski | 227/109 |
| 5,463,807 | A | * | 11/1995 | Hochhausl | 29/809 |
| 5,524,807 | A | * | 6/1996 | Bullard | 227/109 |
| 5,667,126 | A | * | 9/1997 | Boucek | 227/109 |
| 5,906,041 | A | * | 5/1999 | Ito et al. | 29/809 |
| 5,919,120 | A | * | 7/1999 | Pumphrey | 483/1 |
| 5,950,902 | A | * | 9/1999 | Moore, Sr. | 227/130 |
| 6,077,206 | A | * | 6/2000 | Azema | 483/3 |

FOREIGN PATENT DOCUMENTS

| | | | | |
|---|---|---|---|---|
| JP | 04319492 | A | * | 11/1992 |
| JP | 5-212704 | | | 12/1993 |
| JP | 6-238608 | | | 11/1994 |

* cited by examiner

AUTOMATED MACHINE FOR SETTING BENDABLE NAILING PINS ON A FRAME

BACKGROUND OF THE INVENTION

The invention is situated in the technical field of the automatic closure of frames and relates more specifically to an automatic machine for applying bendable pins. From DE 4405661 there is known a machine for applying nails with the aid of a driving-in system, wherein the nails are provided from a dispensing magazine and a detector is capable of signalling the absence of nails in the magazine.

Also known are various types of machine suitable for frames, one of which allows a plurality of bendable pins to be automatically applied to the mouldings of the frame to allow it to be closed with a piece of card. For that purpose, above a work station, which is advantageously an endless belt conveyor, a carriage can move in a longitudinal direction on rails. The carriage carries one or more stapling guns. Each gun is provided with a magazine of bendable pins, which magazine will obviously need replacing or refilling in the event of jamming or when the pins have been all been used. This involves manual manipulation, together with temporary stoppage of the machine. It is also possible to use a device for automatically reloading magazines, but that results in weighty and costly machinery. In addition, such machinery does not solve the problems associated with malfunctions in the operation of the guns. Such machines moreover use only one gun or a plurality of guns, each of which has one or more pins to apply at one or more predetermined locations. The user must therefore ensure that a constant visual check on the presence or absence of the pins is carried out. If a pin is absent, he must decide which gun is defective and then stop the machine and replace the gun. In addition to lost productivity, there is a risk of creating an unsatisfactory product.

SUMMARY OF THE INVENTION

With the aim of avoiding those disadvantages, the invention proposes a solution which consists in arranging, in the vicinity of the work station, a storage rack for guns pre-filled with bendable pins, which the machine will come to collect as and when the contents of the guns are used up, instead of using the same gun or guns and reloading them with pins.

Accordingly, the invention relates principally to an automatic machine for applying bendable pins to a frame, comprising a mobile carriage carrying a gun for the application, which is movable above a work station composed of a table carrying an endless belt, the said gun holding a magazine filled with pins for application, and the machine comprising a detector of pins, which machine is provided with a rack for storing a plurality of guns pre-filled with pins, which rack can itself be accessed by a gun-gripping holder carried by the said carriage, the detector being mounted on the gun so as to be capable of ascertaining the absence of a pin in the frame at the application location and of instructing the movement of the holder towards the rack.

BRIEF DESCRIPTION OF THE DRAWINGS

Specific characteristics and advantages of the invention will emerge from the following description of a non-limiting exemplary embodiment, in which reference is made to the accompanying drawings, in which.

DETAILED DESCRIPTION OF THE INVENTION

Figure 1:
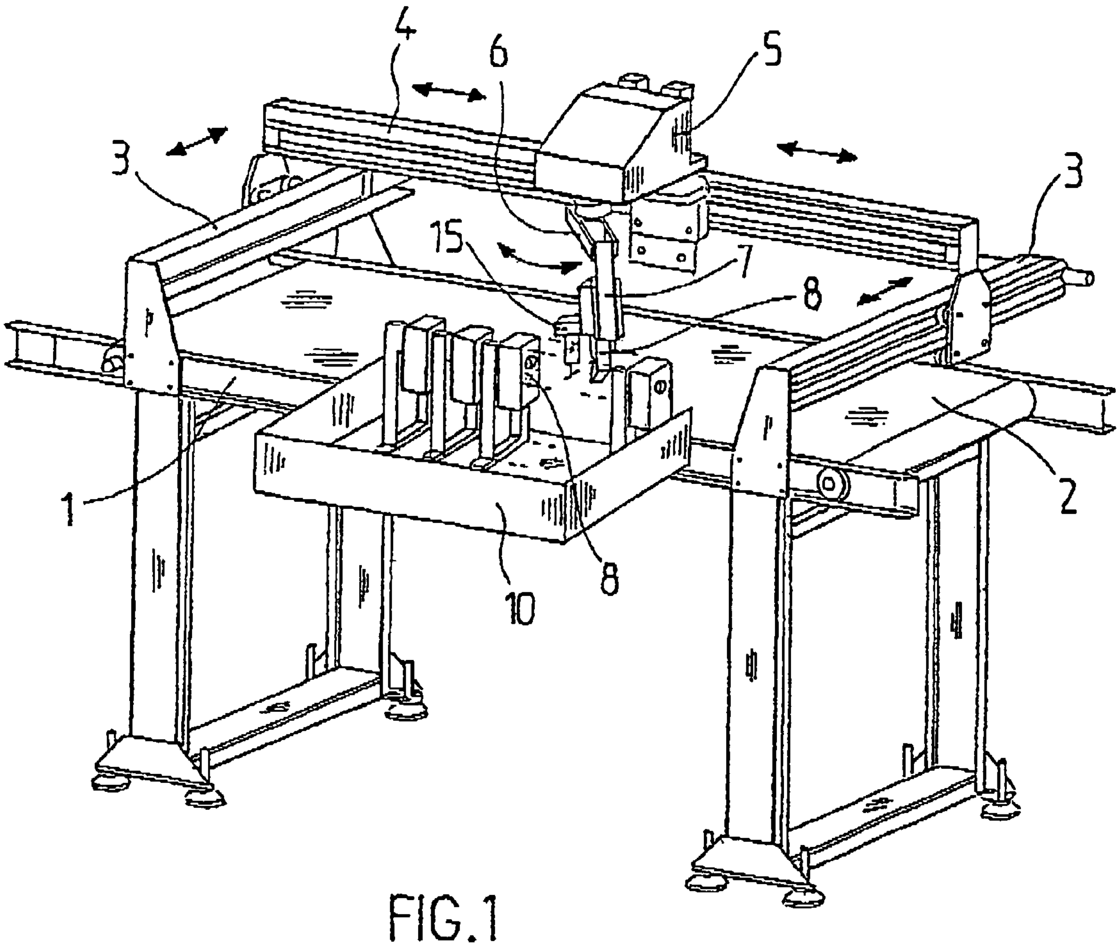
FIG. 1 is a general perspective view of the automatic machine.

The overall view of the machine in FIG. 1 shows that the work station is composed of a table 1, carrying an endless movable belt 2 and, transversely arranged at each end, a rail 3. A travelling gantry 4, which itself carries a movable carriage 5, moves on those rails 3. The carriage, which is movable in a longitudinal direction on the travelling gantry and, by virtue of the rails 3, in a transverse direction, is accordingly capable of covering the entire surface of the work station. Underneath the carriage 5 there is attached a pivoting lever 6, to which a holder 7 is articulated, which itself carries a gun 8 provided for application of the pins to the frame, as is likewise shown in FIG. 2. A positioning actuator 9 allows the holder, and consequently the gun, to be given the desired inclination relative to the belt 2, on which the frame 14 being closed is temporarily immobilised.

On the side of the table 1, there is provided a rack 10 carrying a certain number of guns 8 pre-loaded with bendable pins and arranged one beside the other. The rack can be accessed by the gripping holder 7 carried by the carriage 5 and is advantageously arranged in front of the table 1 and at the level of the conveyor belt 2.

Figure 3:
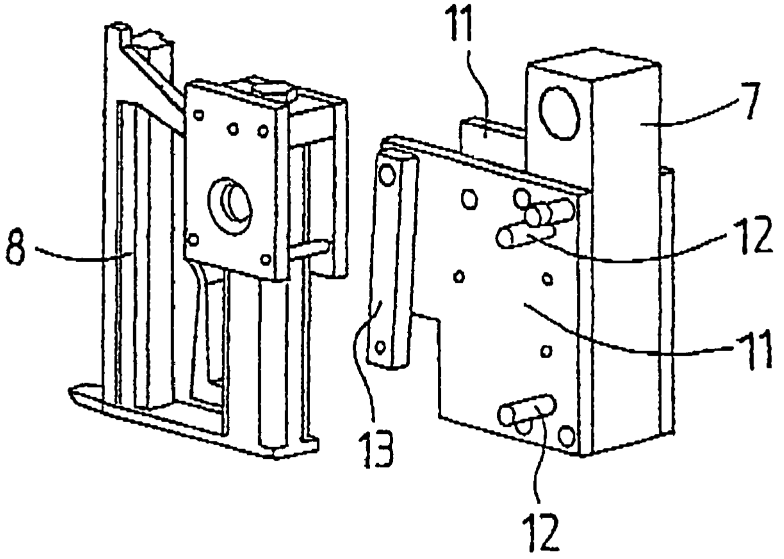
FIG. 3 is an exploded perspective view showing the holder and the gun separated from one another.

FIG. 3 shows more precisely the manner in which the gun 8 is attached to the holder 7. The latter has two side walls 11 forming a clamp, between which walls the gun 8 is housed. The walls can be opened out by moving them apart from one another, lateral pegs 12 ensuring that they are guided when they are moved apart. To one side of one of the walls there is articulated a lever 13, which is the actuator of the trigger of the gun. An automatic air supply to the gun is provided with a sealing gasket located on the side of the holder.

Figure 2:
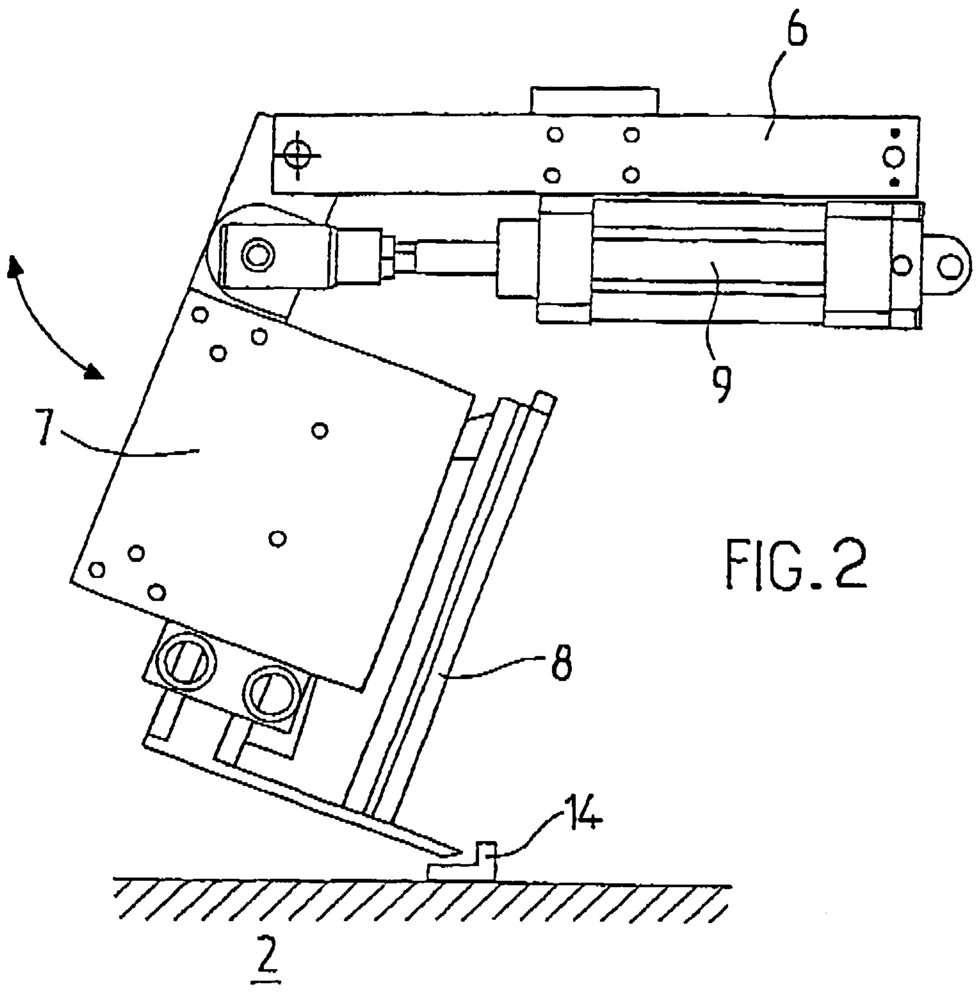
FIG. 2 is an elevation of the holder and the gun in the working position above a table.

FIG. 2 shows the inclined gun 8 resting against a frame moulding 14. The holder gripping the gun has a small actuator arranged perpendicular to the pin and is provided with a detector 15. The actuator folds the pin down on the card, and the detector ascertains its presence.

If the detector 15 ascertains the absence of a pin in the frame at the location in question, that is to say at the application location, a first hypothesis is that the gun has not supplied a pin because it is empty, which is confirmed by counting the number of pins applied compared to the capacity of the gun. The carriage 5 and its pivoting lever 6 then move off and deposit the empty gun on the rack 10; they take up another, full gun and then return, above the frame 14, to the position of the last pin in order to continue the application cycle.

A second hypothesis is that there is an anomaly in the operation of the gun, which is revealed by counting the number of applied pins, which does not correspond to the total number of pins initially loaded into the gun. The gun may go back to re-attempt application but, in the event of a further failure, the gun is taken back to the rack 10 and replaced by another, as in the previous case.

Clearly, all these manoeuvres are managed by computer and the messages “gun empty” or “gun blocked” appear on the screen of the control console.

By this means, the machine allows an increased hourly rate of pin applications to be obtained.

What is claimed is:

1. An automatic machine for applying bendable pins to a frame, comprising a mobile carriage carrying a gun-gripping holder and a gun held by the holder for applying bendable pins to a frame, which carriage is movable above a work station having a table carrying an endless belt on which the frame is located, the gun being filled with said pins, a detector for ascertaining the absence of a pin in a frame on the endless belt, and a rack for storing a plurality of guns pre-filled with the pins, which rack can be accessed by the gun-gripping holder carried by the carriage, wherein the detector is mounted on the gun so as to be capable of ascertaining the absence of a pin in the frame at the location where the pin is applied to the frame on the endless belt and if a pin is absent of instructing the gun-gripping holder to move towards the rack and replace the gun in the gun-gripping holder with a pre-filled gun in the rack.

2. The automatic machine according to claim 1, including an automatic air supply for supplying air to the gun, together with a sealing gasket.

3. An automatic machine for applying bendable pins to a frame, comprising a mobile carriage carrying a gun-gripping holder and a gun held by the holder for applying bendable pins to a frame, which carriage is movable above a work station having a table carrying an endless belt on which the frame is located, the gun being filled with said pins, a detector for ascertaining the absence of a pin in a frame on the endless belt, and a rack for storing a plurality of guns pre-filled with the pins, which rack can be accessed by the gun-gripping holder carried by the carriage, wherein the detector is mounted on the aun so as to be capable of ascertaining the absence of a pin in the frame at the location where the pin is applied to the frame on the endless belt and if a pin is absent of instructing the gun-gripping holder to move towards the rack and replace the gun in the gun-gripping holder with a pre-filled gun in the rack and wherein the gun-gripping holder is provided with two moveable side walls forming a clamp, between which walls the gun is gripped.

4. The automatic machine according to claim 3, including pegs to ensure guidance of the side walls when they are moved apart.

5. The automatic machine according to claim 3, including an automatic air supply for supplying air to the gun, together with a sealing gasket.

* * * * *